United States Patent [19]
Fichter et al.

[11] 3,860,806
[45] Jan. 14, 1975

[54] ELECTRONIC TAXIMETER HAVING PROGRAMABLE CONSTANT FURNISHING MEANS

[75] Inventors: Manfred Fichter, Weiler; Siegfried Spauszus, Villingen; Ulrich Warkentin, Tannheim, all of Germany

[73] Assignee: Kienzle Apparate GmbH, Villingen/Black Forest, Germany

[22] Filed: Jan. 19, 1973

[21] Appl. No.: 323,908

[30] Foreign Application Priority Data
Jan. 21, 1972 Germany............................ 2202865

[52] U.S. Cl. ............................... 235/168, 235/30 R
[51] Int. Cl. .......................................... G06b 13/00
[58] Field of Search.................... 235/156, 30 R, 168

[56] References Cited
UNITED STATES PATENTS

| | | | |
|---|---|---|---|
| 3,388,859 | 6/1968 | Kelch et al......................... | 235/30 R |
| 3,512,706 | 5/1970 | Bruce-Sanders.................. | 235/30 R |
| 3,689,749 | 9/1972 | Johnston............................ | 235/156 |
| 3,698,627 | 10/1972 | Kelch et al........................ | 235/30 R |
| 3,703,985 | 11/1972 | Berg................................... | 235/30 R |

*Primary Examiner*—Eugene G. Botz
*Assistant Examiner*—David H. Malzahn
*Attorney, Agent, or Firm*—Michael S. Striker

[57] ABSTRACT

Measuring means furnish measuring signals signifying the distance travelled and the waiting time to be charged to a passenger. Indicator means indicate the fare to the passenger and also furnish indications of the total distance travelled by the taxi, the total waiting time, etc. as required to determine the taxi driver's pay. Computer and storage means are connected to the indicator means and are arranged internally in said taximeter for computing the fare and the above-mentioned totals in response to input signals. Constant furnishing means are connected to said computer and storage means for furnishing constant signals corresponding to predetermined fare rates, said constant signals and said measuring signals constituting said input signals for said computer and storage means.

18 Claims, 7 Drawing Figures

3,860,806

ELECTRONIC TAXIMETER HAVING PROGRAMABLE CONSTANT FURNISHING MEANS

BACKGROUND OF THE INVENTION

The present invention relates to electronic taximeters. In particular it relates to taximeters in which measuring means furnish measuring signals corresponding both to the distance travelled by the taxi and to the waiting time, both of these values entering into the fare computation. The fare is then indicated on an indicator. In particular, the present invention relates to such taximeters wherein the waiting time and the distance travelled are measured and corresponding separate pulse sequences are furnished.

A known electronic taximeter is described in U.S. Pat. No. 3,512,706. In this patent, a separate pulse sequence is formed for the waiting time and the distance travelled, as described above. Each of these is counted in a counter and the counter outputs are then applied to a mixing circuit which furnishes a pulse sequence corresponding to the pulse sequence of the two input sequences which has the more rapid rate. Further pulse rate reducing circuits and counters are then furnished whose output constitutes a signal to be applied to an electronic indicator. It should be noted that in this known taximeter there is no way in which changes in the fare rate can be entered into the taximeter, other than a complete redesign of the circuit.

SUMMARY OF THE INVENTION

It is an object of the present invention to furnish an electronic taximeter which comprises in the main integrated circuits, such as for example MOS circuits, and has as few mechanical parts as possible. Using circuitry manufactured in accordance with the MOS technique eliminates any possibility for later modification of the circuit by soldered connections, etc. in order to modify the fare rates. It is an object of the present invention to furnish a substantially completely electronic taximeter wherein the change in fare rates can be carried out by changing an externallly available interchangeable constant furnishing circuit which may be plugged into the basic taximeter.

The present invention thus resides in an electronic taximeter having electronic measuring means for furnishing measuring signals signifying the distance travelled and the waiting time to be charged to a customer. The taximeter further comprises indicating means for indicating the fare to the passenger. In accordance with the present invention, constant furnishing means are supplied which are interchangeable and externally available. The taximeter further comprises computer and storage means having inputs connected to said measuring means and said constant furnishing means and an output connected to said indicator means, for computing said fare in response to said measuring signals and said constants.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

A preferred embodiment of the invention will now be described with reference to the drawings.

Figure 1:
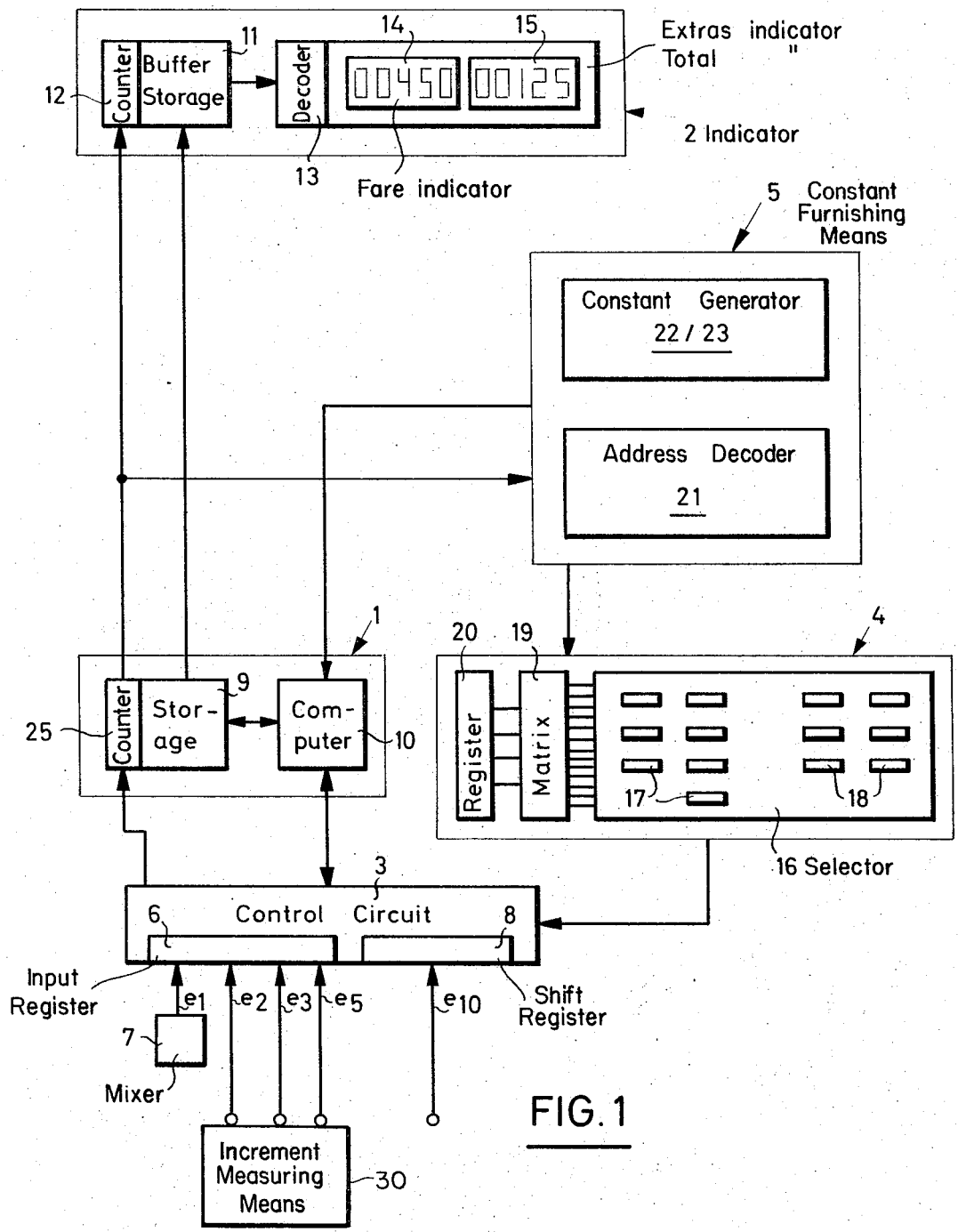
FIG. 1 is a generalized block diagram showing a taximeter in accordance with the present invention.

The major components of the electronic taximeter are shown in block diagram form in FIG. 1. The taximeter comprises a computer and storage means 1, an indicator means 2, control circuit means 3, switching circuit means 4 for controlling the input and output operations and an external constant furnishing means 5 which furnishes constants corresponding to and derivable from predetermined fare rates.

The control circuit means 3 comprise measuring means 6 which are connected to input lines $e1-e6$ (FIGS. 1 + 5). Input line $e1$ receives a pulse sequence which corresponds to the pulse sequence signifying the waiting time or the distance travelled, depending upon which has the higher rate. The pulses signifying the actual distance travelled are received on input line $e_5$. The pulses received on this line may already have a rate reduced in accordance with the desired fare rate. This can, for example, be accomplished by using photoelectric distance measuring means wherein the number of perforations in a disk through which light is transmitted from a light source to a receiver varies in accordance with the desired fare rate. It might be stated in further explanation here that, by fare rate, is meant an incremental distance after which the indicator indicating the taxi fare is to be advanced. For example:

In accordance with a first fare rate the distance increment may correspond to 200 meters.

In accordance with a second fare rate the distance increment may be 150 meters.

In accordance with a third fare rate the distance increment is 100 meters, while in accordance with a fourth fare rate the distance increment is 50 meters.

In order to achieve a particularly exact measurement, it is desirable that at each fare rate, the particular distance increment is represented by the same number of pulses. Thus, for example, 1,200 impulses may be generated for each distance increment. Thus, for the first fare rate, six pulses are generated per meter, for the second fare rate, eight pulses are generated per meter travelled, for the third fare rate, twelve pulses per meter, and for the fourth fare rate, 24 pulses per meter.

The photoelectric measuring means, if the shaft is driven in such a manner that one rotation corresponds to one meter travelled, has disks having six holes for the first fare rate, eight holes for the second fare rate, 12 holes for the third fare rate and 24 holes for the fourth fare rate. Under these conditions, any pulse received at the input on line $e_5$ would directly signify a predetermined fare.

Instead of the arrangement mentioned above, the pulses at the input $e_5$ may correspond only to a particular distance travelled. Under these conditions one pulse may for example signify one-tenth of a meter travelled. In this case the fare increase must be computed by applying constants corresponding to the desired fare rate when computing the fare as a function of the pulses on line $e_5$. This is the situation which will be described herein, since it constitutes the preferred embodiment of the present invention.

The pulses received on line $e_1$ are pulses selected by the circuit 7 which furnishes the pulse sequence corresponding to the time or distance pulse sequence which has the greatest rate. This circuit will be described in greater detail with reference to FIG. 5. The pulses received on line $e_2$ signify the distance travelled, whether the taxi is or is not occupied. It must be noted that the total distance travelled must be available to the taxi driver's employer. This value is normally indicated in mechanical taximeters in a separate counter which counts the total number of kilometers travelled by the taxi. The mechanical taximeters of course also have indicators which indicate the total distance travelled by the taxi in an occupied, that is in a passenger carrying mode. Thus, for example, it may be desirable to apply one pulse to line $e_2$ for each 100 meters travelled by the taxi. This may be accomplished externally by counting down the pulses applied to line $e_5$. Alternatively, it may be done internally within the taximeter in such a manner that for each 1,000 pulses which are applied at input $e_5$, one pulse is applied to input $e_2$.

Timing pulses which indicate waiting time to be charged to the passenger are received on line $e_3$. This line is connected to a timing pulse generator, for example an oscillator which has a frequency of 1 KHz. It should be noted that the so-received timing pulses are not applied directly to stage 7, but are first modified by the control circuit 3 in accordance with constants furnished by the constant furnishing means 5. Thus the charge for the waiting time, too, may be adjusted in accordance with predetermined fare rates.

Synchronizing pulses are received on line $e_{10}$ which are also derived from an electronic oscillator. The synchronizing means furnish the synchronizing pulses which may have a frequency of anywhere from 100 KHz to a MHz and which serve to synchronize the whole taximeter system. The synchronizing pulses are fed into a shift register 8.

Figure 3:
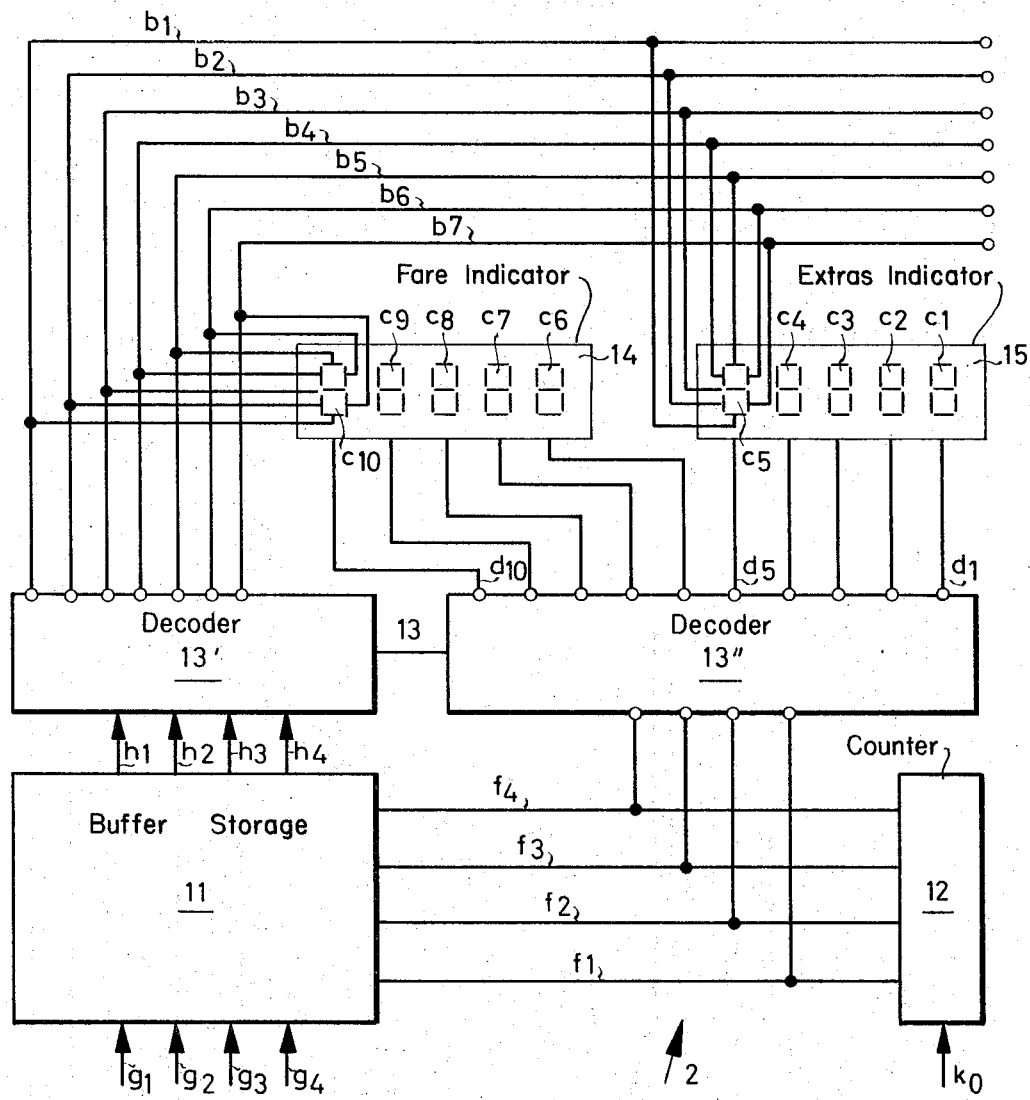
FIG. 3 is a circuit diagram of the indicator means, including associated storage means in block diagram form.
Figure 4:
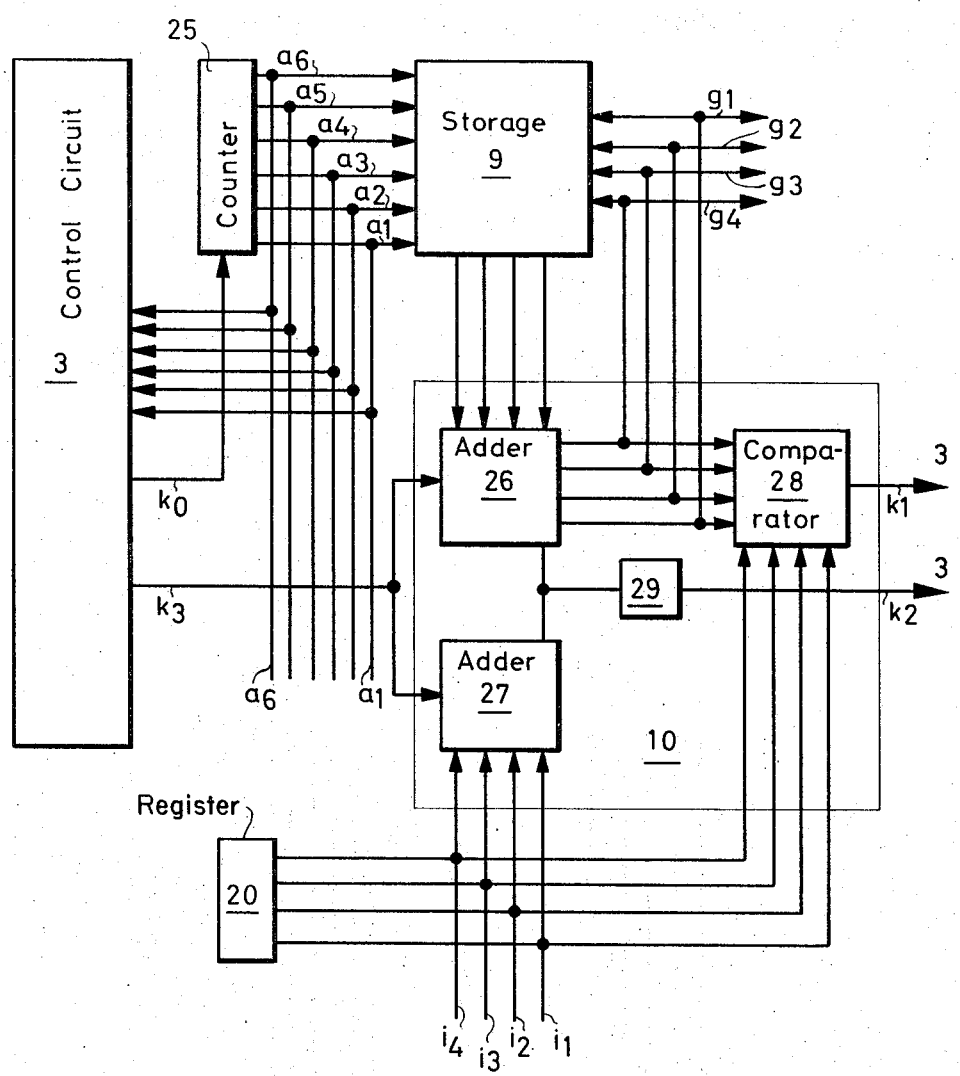
FIG. 4 is a more detailed block diagram of the computer and storage means.

The computer and storage means 1 comprise the storage means 9 and the computer means 10 which will be described in detail with reference to FIG. 4. The indicator means 2 comprise, in the main, a buffer storage 11, a counter 12, a decoding arrangement 13 and two separate indicator sections 14 and 15. The construction and functioning of the indicator 2 will be described in detail with reference to FIG. 3.

Block 4 of FIG. 1 comprises manually activatable switching circuit which comprises an input keyboard 16 having keys for initiating input and output operations. Specifically, keys 17 function for input operations as for example "taxi unoccupied," fare rate 1, fare rate 2, fare rate 3, fare rate 4, cash, and additional charge, while keys 18 control the output operations as for example to initiate the indication of the "total distance travelled with occupied taxi," "total distance travelled occupied or otherwise," etc. Keys 17 and 18 activate contacts which are coded in a matrix 19 which may for example be a diode matrix. The output of the matrix may be a 4-bit binary code which furnishes signals which are stored in a register 20. The contents of register 20 may be transferred to control circuit 3 when required. Of course it goes without saying that instead of the keys shown, input and output operations may be initiated by other switching circuit means, as for example rotary switches. Such rotary switches would initiate the different functions in accordance with the angular positions thereof. Thus for example a first rotary switch may be used to replace keys 17 while a second rotary switch may be used to replace keys 18.

Figure 2:
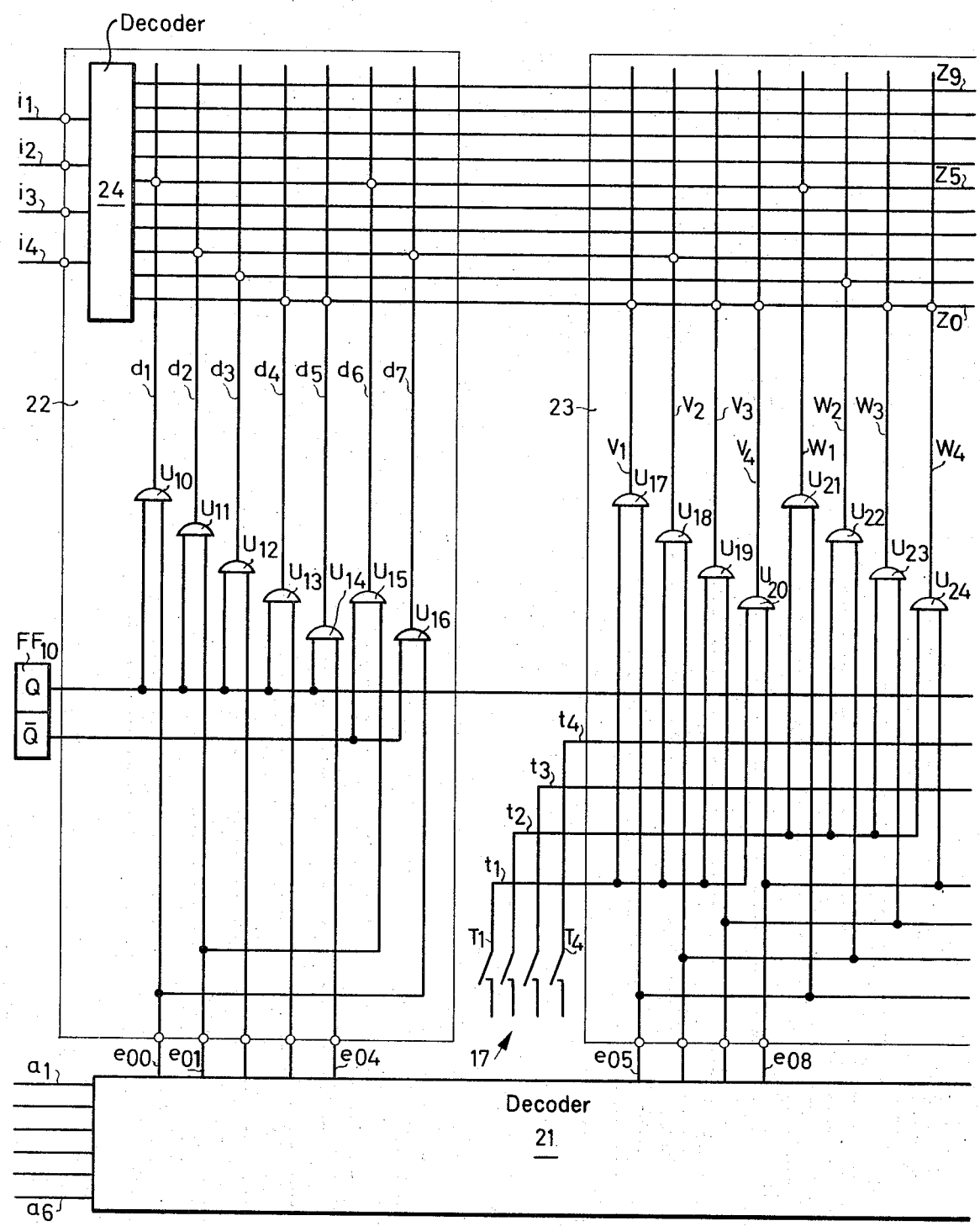
FIGS. 2 and 2a is a circuit diagram of the constant furnishing means.
Figure 2A:
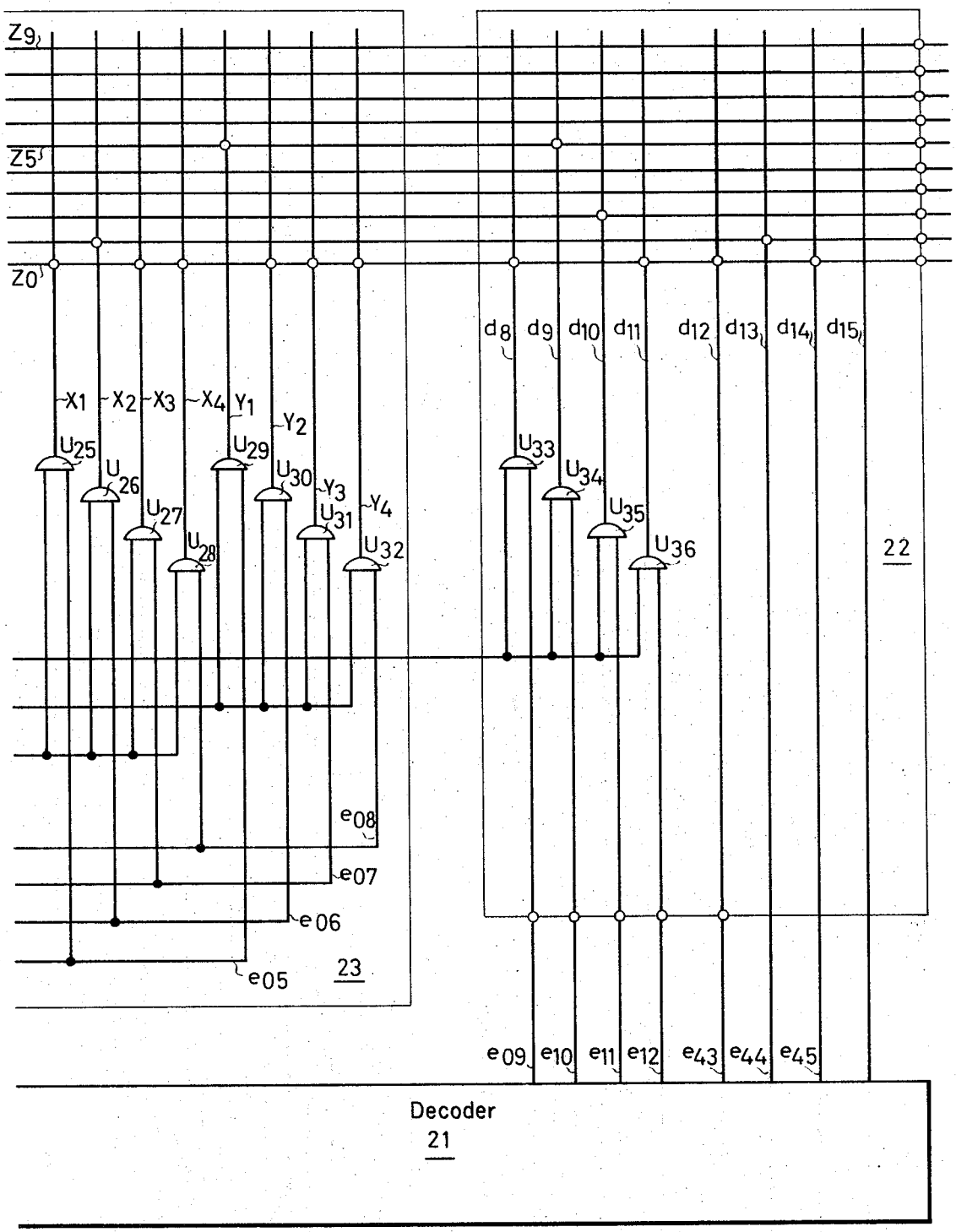

FIGS. 2 and 2a shows the circuit diagram of the constant furnishing means. The constant furnishing means has a constant furnishing input receiving address signals on lines $a_1$–$a_6$. Lines $a_1$–$a_6$ are the output lines of a counter 25 which also controls the addressing of the first storage means, namely storage 9 of FIG. 1. The code combination which appears at the output of counter 25 energizes selected ones of lines $a_1$–$a_6$. This is applied to a decoding arrangement 21 whose output is furnished on lines $e00$–$e45$. Specifically, lines $e00$–$e45$ are energized sequentially within each cycle of operation of the taximeter. The output of the constant furnishing means is supplied on lines $i_1$–$i_4$. These constants are applied to the computer and storage means. The constant furnishing means comprise printed circuit cards 22 and 23 which are interchangeable and may have any desired configuration. For example the connections between input lines $e00$ to $e_n$ and the output lines $i_1$–$i_4$ may be made by solder joints, diodes, screw connections, etc.

A preferred embodiment of the constant furnishing means will now be described with reference to FIGS. 2 and 2a.

As is shown in FIGS. 2 and 2a a plurality of AND-gates, $U10$–$U_n$ have inputs connected to input lines $e0$-$0$–$e_n$ and output lines connected to decimal coded lines $Z0$–$Z9$. It should be noted that not all input lines e have an AND-gate connected to them. For example, lines $e43$–$e45$ are directly connected to the decimal coded lines. The output lines of AND-gates $U10$–$U16$ are labelled $d1$–$d7$, respectively, the output lines of AND-gates $U17$–$U20$ are labelled $v1$–$v4$, respectively, the output lines of AND-gates $U21$–$U24$ are labelled $w1$–$w4$, respectively, the output lines of AND-gates $U25$–$U28$ are labelled $x1$–$x4$ respectively, the output lines of AND-gates $U29$–$U32$ are labelled $y1$–$y4$, respectively, while the output lines of AND-gates $U33$–$U36$ are labelled $d8$–$d11$, respectively. The above-mentioned output lines of the AND-gates are arranged in a vertical direction and therefore intersect the decimal coded lines $Z0$–$Z9$ which extend in a horizontal direction. At desired points of intersection, an electrical connection is made, for example, by soldering as mentioned above. Alternatively, the output lines of the AND-gates may be on the front side of the circuit board, while the decimal coded lines may be on the rear side of the circuit board and holes are provided in the circuit board at the point of intersection. The desired connections are then made by means of screws. Once such a connection has been established, energization of one of the output lines of AND-gates results in a corresponding energization of one of the decimal coded lines. Further, a decoding arrangement 24 is situated on the circuit boad 22. This converts the one-out-of-ten coding existing on the decimal coded lines to a 4-bit binary code. The output of the decoder 24, namely the constant in a 4-bit binary code, is then connected to the computer means 10. Further shown in FIG. 2 is a flip-flop FF10 which may be in a 0I or in a I0 state. The two flip-flop states correspond, respectively, to the condition of "fare I" and "fare II" in the taximeter. These terms will be explained in more detail below. It should only be noted here that when flip-flop FF10 is in the I0 state, AND-gates U10–U14, as well as AND-gates U33–36 are in a conductive state, while, when flip-flop FF10 is in the 01 state, AND-gates U15 and U16 are conductive. Thus when inputs $e00$–$e_n$ are activated in turn by the decoder 21, the corresponding AND-gates furnish a signal at the corresponding AND-gate output lines, which signals are transmitted, as described above to the decimal coded lines Z0–Z9. A corresponding constant thus appears on lines $i_1$–$i_4$.

It should further be noted that on circuit board 23, AND-gates U17–U32 are further energized in dependence upon four conducting lines $t_1$–$t_4$. These conducting lines are externally connected to keys 17, and, specifically, to keys T1, T2, T3 and T4 which, individually, indicate fare rates 1, 2, 3 and 4. Conducting line $t_1$ is connected to one input each of AND-gates U17 to U20, conducting line $t_2$ is connected to one input of each of AND-gates U21–U24, conducting line $t_3$ is connected to one input each of AND-gates U25–U28, conducting line $t_4$ is connected to one input each of AND-gates U29–U32. As shown in FIGS. 2 and 2a the second inputs of AND-gates U17–U32 are connected to the outputs $eO5$, $e06$, $e07$ and $e08$ of the decoder 21. Thus an soon as T1 is closed, AND-gates U17–U20 become conductive and, upon activation of lines $e05$ to $e08$ by the decoder 21 furnish pulses sequentially to the decimal coded lines Z0 to Z9 in accordanace with the connections previously made. AND-gates U21 to U24, U25 to U28 and U29 to U32 are also connected to conductors $e05$ to $e08$. Thus conducting lines $v_1$–$v_4$ carry the pulses for fare rate 1, lines $w1$–$w4$ carry the pulses for fare rate 2, lines $x1$–$x4$ the pulses for fare rate 3 and lines $y1$–$y4$ the pulses for fare rate 4. Since four separate fare rates are not required in a great many taximeters, the printed circuit plate 23 may be limited to, for example, only lines $v1$–$v4$ if only one fare rate is to be implemented, or lines $v1$–$v4$ and $w1$–$w4$ if two fare rates are required. This is also the reason why part of the circuitry is on a separate printed circuit board, namely printed circuit board 23.

A discussion of at least part of the constants which are furnished by printed circuit boards 22 and 23 will now follow. The number and type of constants can change with the fare rate. For example, one of the constants is the base fare, that is the fare which is indicated on the taximeter as soon as it is put into operation. This is the fare which each passenger must pay, independent of the actual distance travelled. Let it be assumed that this constant, namely the base fare, is to be supplied via lines $e00$ to $e04$. Further, let it be assumed that this base bare is $1.25. During each operating cycle of the taximeter, pulses are applied to lines $a1$ to $a6$ which, in their combination, serve to energize input lines $e00$ to $e04$ sequentially. When line $e00$ is energized, a pulse is furnished through AND-gate U10, line $d1$ and line Z5 which causes the output of decoder 24 to furnish the following pulse combination:

| $(2^0)$ | $(2^1)$ | $(2^2)$ | $(2^3)$ |
|---|---|---|---|
| $i1$ 32 1 | $i2 = 0$ | $i3 = 1$ | $i4 = 0$ |

When this "5", which corresponds to the last place in the base fare of $1.25, has been processed, the input $e01$ is energized by a corresponding pulse combination on lines $a1$–$a6$. As a result of energization of line $e01$, AND-gate U11 furnishes a pulse to line $d2$ which, via line Z2 causes the following pulse combination to appear at the output of decoder 24:

| $(2^0)$ | $(2^1)$ | $(2^2)$ | $(2^3)$ |
|---|---|---|---|
| $i1 = 0$ | $i2 = 1$ | $i3 = 0$ | $i4 = 0$ |

After this value, which corresponds to the "2" in the base fare of $1.25, has been processed, the numeral "1" is similarly processed by the energization of line $e02$.

Energization of lines $e03$ and $e04$ causes corresponding zero values to appear at the output of decoder 24, that is lines $i_1$–$i_4$ all carry zeros. This of course is due to the fact that only three digits are contained in the base fare. It should be noted that for the above operation to take place, flip-flop FF10 must be in the I0 state. Flip-flop FF10 in actual practice is a part of the control circuit 3 and has been added to the constant furnishing means of FIG. 2 only for purposes of clarity.

The reason for the different states of flip-flop FF10 will now be explained. Flip-flop FF10 is in the I0 state when the base fare is being indicated on the indicator means, but when the distance or waiting time which is paid for by the base fare has not yet expired; flip-flop FF10 is in the 0I condition, after the service rendered to the passenger, is equal to the base fare. Thus, when the flip-flop is in the 0I state, the normal advance of the indicator corresponding to the fare rate in force has to take place.

It might be noted here in addition that the base rate is actually an equivalent of the increment required to advance the taximeter. For example, to remain with the given example, the base rate of $1.25 may be equal to the fare increment which is, for example, based on a 200 meter distance or a 20 second waiting time or a mixture of both. However, it is equally possible, that the base rate is the equivalent of an integral multiple of the fare increment or a fraction thereof. For example, the indicated fare may advance in steps of $0.25. The base rate of $1.25 is to pay for a distance travelled of 500 meters or an equivalent waiting time. Then the base rate covers a distance equal to two and one-half times the distance for a fare increment or the equivalent waiting time. The distance equivalent to the base fare (500 meters in the above example) is normally referred to as the initial distance, even though, as explained above, not only an initial distance but a corresponding waiting time may be involved.

In order of take account of all these factors, it is necessary that constants be furnished which correspond to the base rate, to the distance increment for which the fare is advanced under normal conditions and for the initial distance, that is the distance which is paid for by the payment of the base fare.

Thus the base fare is first entered through lines $e00$ to $e04$ and the individual fare increments are then also transmitted by energizing these lines, so that the total fare comprises the base fare in addition to the fare increments. After the taxi has rendered a service corresponding to the base fare, flip-flop FF10 is switched to the 01 state causing AND-gates U15 and U16 to become conductive. The other inputs of AND-gates U15 and U16 are connected to lines $e00$ and $e01$ respectively. Thus the fare increments are transmitted via lines $e00$ and $e01$ after flip-flop FF10 has changed its state. Thus, in the example shown in FIG. 2, a sequential energization of lines $e00$ and $e01$ when flip-flop FF10 is in the second state, causes the constant of $0.25 to appear on output lines $i1-i4$. Thus lines $e00$ to $e04$ are used twice, that is first to furnish the constant corresponding to the base fare and later to furnish the constant signifying the value of the fare increment.

Output lines $e05$ to $e08$ of the decoder 21 are also utilized more than once, as is evident with the description of the printed circuit board 23 which is given above. Each line $e05$ to $e08$ allows the specification of one numeral for each fare rate T1 to T4. These fare rates may be the following:

Fare rate 1 = 200m = 2,000 pulses.

Fare rate 2 = 150m = 1,500 pulses.

Fare rate 3 = 100m = 1,000 pulses.

Fare rate 4 = 50m = 500 pulses.

If the number of pulses is reduced by a factor of 100 to 1 either previously or after the constant is furnished, then fare rate 1 corresponds to a pulse reduction rate of 20 to 1, fare rate 2 to a pulse reduction rate of 15 to 1, fare rate 3 to a pulse reduction rate of 10 to 1 and fare rate 4 to a pulse reduction rate of 5 to 1.

The connections between the vertical conducting lines $v1$ to $y4$ and the horizontal lines Z0 to Z9 on printed circuit board 23 are indicated by the circle.

A further constant, which has been defined above, is the initial distance. This, too, must be furnished by constant furnishing means 5. For this purpose lines $e09$ to lines $e12$ are energized and furnish, over AND-gates U33 to U35 and lines $d8$ to $d11$ the number "250," at the output of the constant furnishing means. As previously explained, this number corresponds to the initial distance.

A further constant which must be furnished by constant furnishing means 5, is the constant required for stepping down the repetition rate of the waiting time pulses. This is furnished by energization of lines $e43$ to $e46$. As will be explained in more detail later on, the pulses which are supplied on line $e3$ must be reduced in frequency by a ratio of 10 to 1. Under these conditions, 200 meters of travelled distance correspond to a waiting time increment of 20 seconds, if the oscillator which furnishes the timing pulses operates at 1,000 Hz.

A further constant which also must be supplied by printed circuit board 22 is the additional charge, that is the amount which must be added to the portion of the indicator means indicating additional charge upon activation of the corresponding key 17. This takes place when one of the lines $e00$ to $e_n$ is energized, but will only be explained in more detail later on with relation to the organization of storage 9.

To summarize, the constant furnishing means, which are exchangeable and externally available, comprise the decoding arrangement 21, which converts the signals which are furnished by lines $a1$ to $a6$ into the sequential energization of lines $e00$ to $e_n$ in a predetermined order. This energization in turn results in predetermined constants appearing in a predetermined order at the output of the constant furnishing means, namely on lines $i1-i4$. These constant values are then supplied into the computer and storage means 1.

The indicator means 2 will now be described with reference to FIG. 3. Shown in FIG. 3 are a buffer storage 11, an address counter 12, which serves to address the individual storage locations, and a decoding arrangement 13 which comprises a first part 13' and a second part 13''. Further, the indicator means comprise a first indicator section 14 and a second indicator section 15, each of which provide an indication of five numerals. In the Example shown in FIG. 3, the known type of seven segment indicator is used, that is each numeral which is to be indicated comprises seven selectively energizable segments. Thus seven lines are required for the selective energization of a numeral in each indicator position. The seven lines are designated by $b1$ to $b7$ respectively. Each of lines $b1$ to $b7$ is connected with the same segments within each numeral $c1$ to $c10$ of the indicator means 14 and 15. The decimal numerals $c1$ to $c5$ constitute the indicator portion 15, while the decimal numerals $c6$ to $c10$ constitute the indicator portion 14. Indicator portion 14 serves to indicate the individual fares as long as the taximeter is operating. Indicator portion 15 serves a variety of purposes. While the taximeter is operating, that is while indicator 14 shows the current price or fare, indicator 15 shows the extra charges. When the taxi is standing still and when the taximeter is not operative, indicator portion 15 can be utilized to indicate various accumulated values as for example the total distance travelled while the taxi was occupied, the total distance travelled whether occupied or unoccupied, the total number of additional charges, the total number of fares transported, etc. Thus it is this portion of the indicator which is used to furnish all values which are required in order to effect an accounting between the fleet owner and the driver. These values are normally indicated by mechanical control counters in mechanical taximeters of conventional type.

The individual numerals $c1$ to $c10$ are energized sequentially via lines $d1$ to $d10$ through decoder 13''. To summarize, the seven information bits which serve to energize the individual segments of numerals $c1$ to $c10$ via lines $b1$ to $b7$ are furnished in parallel by the decoder 13' over lines $b1$ to $b7$. However, the signals for the selection of the corresponding numerals $c1$ to $c10$ are serially supplied via lines $d1$ to $d10$. However the energization of lines $b1$ to $b10$ follows at such short intervals that, although pulses are applied to each numeral $c1$ to $c10$ for only a short time interval the persistance of vision of the human eye causes the indicator to seem to be continuously energized. However, since the indicator is not continuously energized but constantly reenergized, it is required that the values to be indicated are stored in the buffer storage 11. This buffer storage may be a matrix having ten storage location of four bits each, corresponding to the ten numerals $c1$ to $c10$. In order to address the storage for storing the data bits, the address counter 12 is provided which is a binary counter and which energizes the storage locations in sequence. For this purpose the output of counter 12 is connected to buffer storage 11 via line $f1-f4$. These lines are also tied to the input of decoder 13 so that the correct decimal place $c1$ to $c10$ of the indicator is selected simultaneously with the corresponding storage location in storage 11. The value stored in the storage locations of buffer storage 11 is transferred into the buffer storage via lines $g1$ to $g4$ which connect buffer storage 11 to storage 9 of the computer and storage means 1. Storage 9 is herein referred to as the first storage means. Normally, the connection is such that determined storage locations of storage 9 correspond to determined storage locations in buffer storage 11, so that any changes which occur in storage 9 are carried out simultaneously in storage 11. However, when one of the keys 18 is operated, that is when an output operation is to take place, the contents of storage 11, which normally comprise the individual fares and the additional charges of said individual fares, is destroyed and those values are entered which are present in the corresponding storage spaces for the total values in storage 9. These values are then transferred to the indicator 15.

Figure 5:
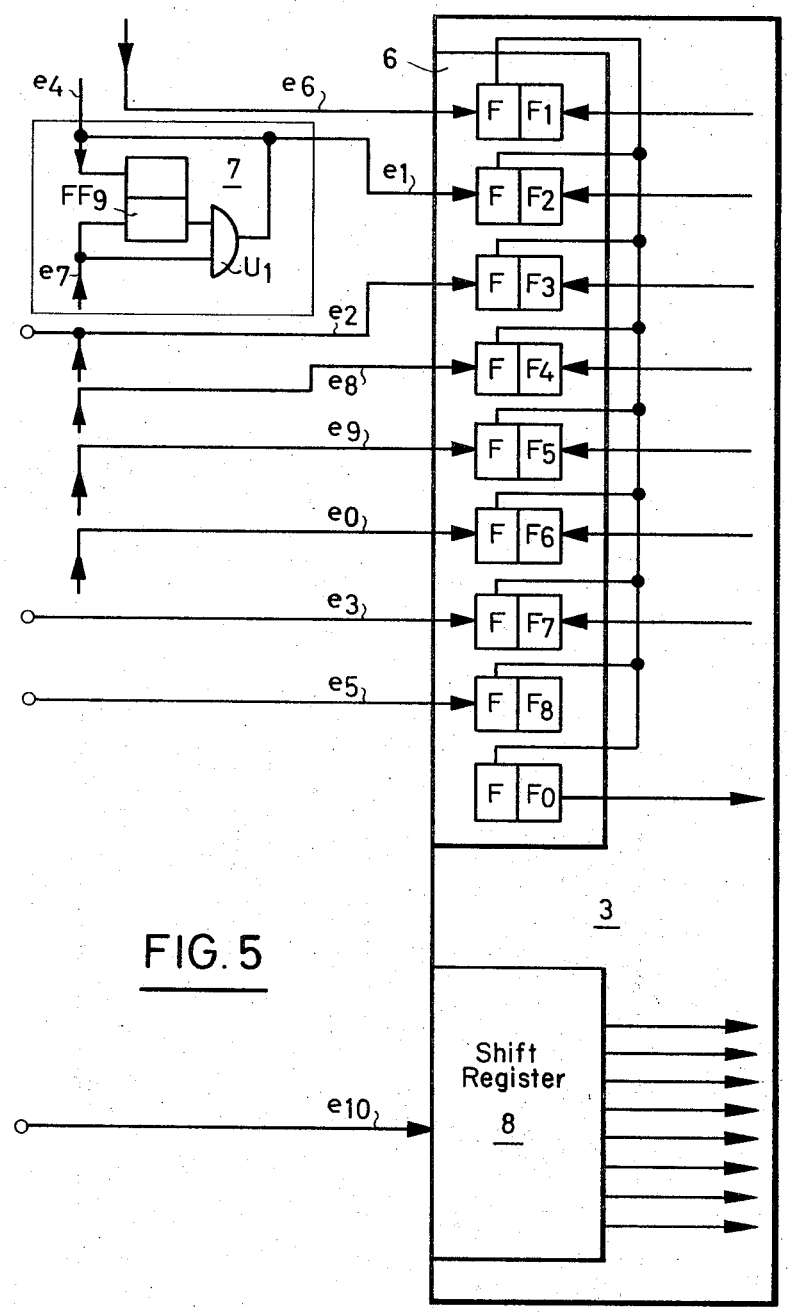
FIG. 5 is a more detailed block diagram of the measuring means.

A short explanation of the functioning of input register 6 as shown in FIG. 5 follows: This input register comprises eight flip-flops FF1 to FF8 each of which serves the function of an intermediate storage as well as a flip-flop FFO which constitutes an output stage. Each of flip-flops FF1 to FF8 stores a value furnished by a corresponding measuring instrument until these values are called out by the translater portion of the control circuit 3 and transferred to the output stage comprising flip-flip FFO. From there the contents of the flip-flops are then processed in the remainder of the syste. Flip-flop FF1 receives a pulse via line $e6$ as soon as the computing and storage means has determined that the indicator means have to be advanced. For example, in the example given above, flip-flop FF1 is set as soon as, under fare rate 1, 2,000 distance or timing pulses have been counted and stored in the computer and storage means 1. Flip-flop FF1 is thus not directly connected to the measuring instruments but receives its information from the computer and storage means via the control circuit 3.

Flip-flop FF2 serves to store individual pulses which might be either distance indicating pulses or waiting time indicating pulses, depending on which pulse sequence has the higher rate. These pulses are present at the output of a circuit 7 which, as previously stated, selects the pulse sequence having the higher rate. As shown in FIG. 5 this is accomplished in the following way: First, all distance pulses which arrive at line $e5$ are used directly for setting flip-flop FF8. After these pulses have been reduced in rate in accordance with the tariff or fare rate in effect, they are applied via input $e4$ to flip-flop FF9 which is part of the above-mentioned circuit 7. The timing pulses, also after reduction in rate if required in the computer and storage means, are applied via a line $e7$ for resetting flip-flop FF9. Line $e7$ is not only applied to the reset input of flip-flop FF9, but also to one input of an AND-gate U1 whose other input is the reset output of flip-flop FF9. This output thus carries a I signal after a timing pulse has been applied via line $e7$ to flip-flop FF9. Flip-flop FF9 is so constructed that the first timing pulse arriving over line $e7$ is used to flip the flip-flop from its "10" state to its "OI" state. Only the second pulse arriving on line $e7$ is thus transmitted through AND-gate U1 so that AND-gate U1 furnishes a pulse to line $e1$. Flip-flop FF9 and AND-gate U1 thus together form the circuit 7 which, in itself is a known circuit and serve to select the higher one of the pulse sequences furnished on lines $e4$ and $e7$ to constitute the output applied to flip-flop FF2 through line el.

A further flip-flop FF3 serves to store the 100 meter distance pulses. That is the pulses which are used in order to compose the total distance travelled by the taxi or the total distance travelled when in an occupied state. Again, the pulses applied to line $e2$ may be pulses whose rate is determined by the constant furnishing means 5 operating in conjuction with the computer and storage means 1. For example if the input constant of the computer 10 is 10 pulses per meter travelled, then the constant furnished must be 1,000, since 100 meters are equivalent to 1,000 pulses.

Flip-flop FF4 is set via line $e8$, when one of input keys 17 is activated to indicate an additional charge. Flip-flop FF5 is set via a line $e9$ as soon as the taximeter is put into operation through activation of one of the keys 17. Flip-flop FF6 is set through a signal on line $e0$, as soon as a fare or a distance travelled or a waiting time is reached wherein a change from one fare rate to another is to take place. It should be noted here that lines $e6$, $e4$, $e7$, $e8$, $e9$ and $e0$ each have an arrow which is to indicate that they are not actually connected with the external measuring elements, but derive their input signals from the computer and storage means 1, as soon as predetermined conditions are achieved. The only input lines which are directly connected to the measuring elements are lines $e5$ and $e3$, while line $e2$ can be selectively connected either to the measuring element or internally. The synchronizing pulses which, as mentioned above, are furnished via line $e10$, are entered into a multistage shift register 8 and serve to control the individual steps within the cycles of the computer and storage means through use of the control circuit 3. For each received synchronizing pulse, the shift register furnishes a synchronizing pulse over one of its output lines and thus controls the microsteps within the overall cycle.

Flip-flop FFO serves as the output flip-flop associated with the intermediate storage flip-flops FF1 to FF8. At certain steps within the overall cycle, the condition of flip-flops FF1 to FF8 is interrogated sequentially and, if one of these flip-flops are set, its contents is transferred to flip-flop FFO. The signal is then further processed via the control circuit 3 and applied to the computer and storage means 1.

The computer and storage means will now be described in further detail. This will be done with reference to FIG. 4. As shown in FIG. 4 the storage 9 comprises 48 storage locatons, that is it is capable of accommodating 48 numerals in a binary coded form. Each storage location thus accepts four bits. An address counter 25 serves to address the different storage locations. Since this binary counter has six stages, it is capable of counting from zero to 63. However, its counting capacity is limited to "48," so that after the 48th pulse, the counter is reset to "0". The counter is advanced via line $k0$, which also furnishes the pulses advancing counter 12 associated with storage 11. In response to each pulse received over line $k0$, the counter generates a 6-bit address which addresses storage 9, as mentioned above, via lines $a1$ to $a6$. The information in the so-selected storage location is then transferred to the computer means, and specifically to section 26 of a serial adder 26/27 and, if required, via lines $g1$ to $g4$ into storage 11.

The 48 storage locations in storage 9 are sufficient for storing all variables generated during the formation of the fare and further, generated during the formation of the various totals required for effecting the accounting between the fleet owner and the taxi driver. A possible storage layout is given in the following table:

| Storage location | | | |
|---|---|---|---|
| a 00 | Fare | Base Fare | Fare Increment |
| a 01 | | Fare I | Fare II |
| a 02 | | | |
| a 03 | | | |
| a 04 | | | |
| a 05 | | | |
| a 06 | | | |
| a 07 | | | |
| a 08 | Distance Pulse Rate Reduction Fare Rates 1,2,3,4 | | |
| a 09 | Initial Distance | | Pulse Rate Reduction 100:1 |
| a 10 | Fare I | | Fare II |
| a 11 | | | |
| a 12 | | | |
| a 13 | | | |
| a 14 | | | |
| a 15 | Additional Charges | | |
| a 16 | | | |
| a 17 | | | |
| a 18 | Total Additional Charges | | |
| a 19 | | | |
| a 20 | | | |
| a 21 | | | |
| a 22 | | | |
| a 23 | Total Fare Collected | | |
| a 24 | | | |
| a 25 | | | |
| a 26 | | | |
| a 27 | Total Distance Travelled | | |
| a 28 | | | |
| a 29 | | | |
| a 30 | | | |
| a 31 | | | |
| a 32 | Occupied Distance Travelled | | |
| a 33 | | | |
| a 34 | | | |
| a 35 | | | |
| a 36 | Number of Journeys | | |
| a 37 | | | |
| a 38 | | | |
| a 39 | | | |
| a 40 | Automatic Fare Rate Change | | |
| a 41 | | | |
| a 42 | | | |
| a 43 | | | |
| a 44 | Time Pulse Rate Reduction | | |
| a 45 | | | |
| a 46 | | | |
| a 47 | Input Command | | |

It will be noted that the storage locations $a00$ to $a04$ contain the fare during the individual ride, which fare comprises the base fare and the sum of the fare increments. Similarly, storage locations $a05$ to $a08$ carry the distance reduction rate corresponding to fare rate 1 to fare rate 4, while storage locations $a09$ to $a12$ furnish the constant for the initial distance while flip-flop FF10 is in its first state and furnish a pulse rate reduction of 100:1 when flip-flop FF10 is in the second state. Locations $a17$ 17 to $a37$ are reserved for the storage of the total additional charges, the total distance travelled, the distance travelled while occupied, and the number of journeys. These storage locations do not correspond to any constants furnished in the constant furnishing means 5, causing the corresponding output lines of the decoding arrangement 21 in constant furnishing means 5 to be disconnected.

Storage locations $a43$ to $a45$ serve to store the timing pulses which arrive from the timing pulse generator via line $e3$. These pulses have a reduced rate corresponding to the constant furnished by constant furnishing means 5 prior to being applied to input $e7$ of circuit block 7.

In order to explain some of the above concepts more clearly, an example will be used. It will be assumed that the waiting time increment, that is the waiting time which is to cause a fare increment, is 20 seconds. Under conditions of fare rate 1 of the above-described example this corresponds to a travelled distance of 200 meters. Thus for each pulse at the output of block 7 to have the same value relative to a fare increment, the distance increment pulses supplied at input $e4$ have undergone a pulse rate reduction of 20 to 1. Similarly, for a timing pulse generator which generates 1,000 pulses per second, that is 20,000 pulses in 20 seconds, which corresponds to 2,000 distance increment pulses at fare rate 1. If the 100:1 rate reduction which will take place following stage 7 is taken into consideration, then the timing pulses must undergo a reduction of 10:1. Thus the pulses which arrive at input $e3$ are stored in storage locations $a43$ to $a45$. The pulses stored in these storage locations are then compared with the output of constant furnishing means 5 (outputs $e43$ to $e45$ of decoder 21) and a pulse is furnished to line $e7$ when the comparator shows that the number of pulses stored in locations $a43$–$a45$ is 10 pulses.

The computer means 10 comprise a first portion 26 and a second portion 27 of a serial adder. Reference to the drawing shows that adder portions 26 accepts the signals from storage 9. For the pulse rate reduction mentioned above, it is seen that adder portion 26 furnishes signals to one input of comparator 28, while the other input of comparator 28 is connected to line $i_1$–$i_4$ which are the output lines of constant furnishing means 5. Comparator 28 thus continuously compares the number of pulses stored in storage 9 to the number of pulses required until a pulse of reduced rate is to be furnished at the output of comparator 28, namely on line $k1$. From line $k1$ the pulses of reduced rate are then applied to the correct one of lines $e1$–$e5$ as determined by the control circuit 3.

The control circuit 3 is not discussed in detail here since it is an extremely complicated network. However, it should be clear that this circuit controls the timing of all the components of the taximeter and serves to carry out all the logical decisions generated in the computer 10. Thus control circuit 3 carries out a number of synchronizing steps which together constitute the overall cycle. Thus in each cycle, counter 25 counts 48 steps, thereby addressing storage spaces $a00$ to $a47$ of storage 9. Counter 12 of course is operated in synchronism with counter 25. However, buffer storage 11 has only 10 storage locations, so that counter 12 counts 4.8 times for each individual runthrough of counter 25. Counter 12 is synchronized to counter 25 at the beginning of each overall cycle.

The adder comprises not only the first and second portions 26 and 27, but also comprises a carry storage 29. The signal generated in the carry storage is also applied to the control circuit 3. It will be noted that adder portion 27 also has inputs connected to the outputs of constant furnishing means 5, namely lines $i4$–$i1$. However the operation of the adder and the comparator will become clearer with reference to the following example:

At the beginning of each fare activation of the taximeter by actuation of either the keys for fare rate 1, 2, 3 or 4 the base fare is caused to be etered into indicator 14. Since the fare is to be stored in storage locations $a00$ to $a04$ of storage 9, these storage locations must of course be zero at the beginning of each journey and then must be advanced to the base fare, namely, $1.25.

The first cycle thus starts with the transfer of the value stored in storage location $a00$ of storage 9 to the portion 26 of the serial adder.

Since the output of counter 25 which is furnished on lines $a_1$ to $a_6$ also constitutes the input to the constant furnishing means, line $e00$ of the constant furnishing means is energized simultaneously with the first storage location in storage 9. The value "5" stored in this position of constant furnishing means is thus transferred to portion 27 of the serial adder. At this time flip-flop FF10 is in the conditions "I0". The control circuit 3 now furnishes a signal via line $k3$ which is applied to both portions of the adder. Specifically, adder 26 is caused to count forward, while adder 27 is forced to count in the reverse direction. Thus for the first pulse applied on line $k3$ the portion 26 is increased by "1," while portion 27 is set to "4." Pulses are now applied by line $k3$ until adder 27 is set to "0". At this point no additional pulses are furnished on line $k3$ and the contents of adder 26 is transferred into the storage location $a00$ of storage 9. Storage location $a01$ is now interrogated. The contents of this storage location is transferred to adder 26. Simultaneously line $e01$ of the constant furnishing means is energized so that the value "2" is entered into portion 27 of the serial adder via lines $i1$ to $i4$. In this case two pulses on line $k3$ are required intil adder 27 stands at "0" and the numeral "2" is present in adder 26. Again, the contents of adder 26 is now transferred to third location $a01$. The process is now repeated with interrogation of the storage location $a02$ and a simultaneous transfer of the numeral "1" from the constant furnishing means via lines $i1$ to $i4$ to adder 27. Again, after transfer to adder portion 26 by means of the pulses applied in line $k3$, the numeral "1" is entered into storage location $a02$ in storage 9. The fourth and fifth place of the base fare each of which is zero in the above example, is then processed in the same fashion. At the end of this part of the cycle the value of $1.25 is thus stored in storage locations $a00$ to $a04$ of storage 9. It should also be noted that the same values were simultaneously entered into storage 11. Thus this value is now stored in storage 11 and is then transferred to the indicator means 14 during the remainder of this cycle.

Of course immediately upon the beginning of the trip, that is with activation of any of the keys indicating fare rate 1, etc., the measuring elements have begun to operate. Thus distance pulses are received at input $e5$ and timing pulses at input $e3$. Each distance pulse sets flip-flop FF8, each timing pulse flip-flop FF7. Further, flip-flop FF5 is set as soon as any of the keys for fare rates 1 to 4 have been activated. It should be noted here that flip-flops FF1 to FF8 are always interrogated ion synchronism with the corresponding storage locations in storage 9. For example flip-flop FF2 is always interrogated simultaneously with storage location $a09$, since, under fare 2, the time and distance pulses together form the pulses for determining the fare increment after the base fare has been exhausted and, while the base fare is still in effect, these pulses together constitute the initial distance and must be stored here. Similarly, flip-flop FF3 is interrogated both when storage location $a28$ is interrogated and when storage location $a30$ is interrogated while the taximeter is operative. When the taximeter is not operative, flip-flop FF3 is only interrogated simultaneously with storage location $a26$. Storage locations $a30$ and $a30$ change its contents only when the taxi is operating with a fare, while storage positions $a26$ to $a29$ are advanced whenever the vehicle is in motion.

Following the above-described storing of values in storage locations $a00$ to $a04$, storage location $a05$ is addressed, simultaneously with flip-flop FF8. Flip-flop FF8 is set as soon as the vehicle has started and the first distance pulse has been received on line $e5$. If flip-flop FF8 is set, a pulse is applid to adder portion 27. Simultaneously the contents of storage location $a05$ is transferred into portion 26 and, as previously described, the contents of adder portion 27 is added to the contents of adder portion 26 and the resulting sum transferred back into the storage 9. If a carry-over signal is generated, this signal is stored in store 29 and is added when storing a value in the next subsequent storage location, that is in storage location $a06$. After the processing of storage locations $a07$ and $a08$, the contents of storage locations $a05$ to $a08$ is compared to the constant furnished at lines $i1-i4$ of the constant furnishing means 5. If there are unequal, no output is furnished by comparator 28. However, when equality exists (20 distance pulses reached), a signal is furnished on line $k1$ at the output of comparator 28 which is applied to line $e4$ as well as line $e1$, thereby setting flip-flop FF2 and flip-flop FF9.

Next, storage location $a09$ is interrogated. At the very beginning of the trip, of course flip-flop FF2 is not set and storage locations $a09$ to $a12$ are set to "0." Thus no change occurs in storage locations $a09$ to $a12$ at the beginning of the trip.

However, if flip-flop FF2 has been previously set, a "1" is added to the contents of storage location $a09$ and, simultaneously, a comparison is carried out by comparator 28 between the new contents of storage location $a09$ and the constant value furnished at the output $e09$ of constant furnishing means 5. As previously mentioned, outputs $e09$ to $e12$, when flip-flop FF10 is in its first state, furnish a number corresponding to the initial distance, that is the number "250." Thus, if after a plurality of cycles the value stored in storage locations $a09$ to a 12 corresponds to "250," flip-flop FF10 is switched from its first to its second state. However, a pulse for advancing the indicator is applied to flip-flop FF1 only after the contents of storage location $a09$ to $a12$ have increased to "100" after the above-mentioned change in flip-flop FF10. Only then can flip-flop FF2 be set. Thus after the value "250" has been stored in storage locations $a09$ to $a12$ following the start of the trip and flip-flop FF10 has changed state, and the storage locations $a09$ to $a12$ have again reached the value "100" then a pulse is entered into flip-flop FF1. During the next cycle the fare increment is then added to the base fare previously stored in storage locations $a00$ to $a04$. That is, the constant furnished at outputs $e00$ and $e01$ of the constant furnishing means 5, that is the value of $0.25 is added in storage locations $a00$ and $a01$. This addition is also carried out in storage 11 and transferred to the indicator.

During the interrogation of storage locations $a13$ to $a16$, it is determined whether flip-flop FF4 is set, that is whether the additional charge key has been activated. If this is the case, a "1" is added in storage locations $a13$ to $a16$. The same is true for storage locations $a17$ to $a20$, when an additional charge has been entered. A "1" is also added in storage locations $a21$ to $a25$ when flip-flop FF1 was set in the same cycle, that is when the fare increment of $0.25 is to be added. A "1" is added in storage locations $a26$ to $a29$ if flip-flop FF3 is previously set. The same is true for storage locations $a30$ to $a33$. A "1" is also added in storage locations $a34$ to $a37$ since the keys for fare rate 1, 2 or 3 were activated at the beginning of the trip. Storage locations $a43$ to $a45$ receive an additional "1" if flip-flop FF7 is set, that is if a timing pulse was received at input $e3$. At this point, as explained above, the pulse rate reduction in the ratio of 10:1 takes place before these pulses are applied to input $e7$ of stage 7.

It should be noted at this point that the time for one total cycle must be such that even for the fastest input rate at input $e5$ flip-flop FF8 can receive a pulse only once per cycle. Since a taxi is allowed to operate at a maximum velocity of 130 kilometers per hour, approximately 400 pulses per second may arrive at input $e5$. The time for the total cycle of the storage must thus be less than 1/400 of a second.

To summarize the functioning of the arrangement of the present invention: At first the base fare is stored in storage locations $a00$ to $a04$. The distance pulses are stored in storage locations $a05$ to $a08$, while the time pulses are stored in storage locations $a43$ to $a45$. Thus at fare rate 1, that is 2,000 pulses for each advance of the indicator, an output pulse is generated after 20 pulses are stored in storage locations $a05$ to $a08$. This pulse is applied to input $e4$ of the mixing stage 7. Ten pulses are stored in storage locations $a43$ to $a45$ until a single pulse is transferred to the input $e7$ of the mixing stage 7. The pulses at the output of the mixing stage 7, which selects the pulses having the highest pulse rate, are first stored in storage locations $a09$ to $a12$. While flip-flop FF10 is in its first state, these pulses are stored until the initial distance as furnished by constant furnishing means 5 has been passed. Thereafter flip-flop FF10 is switched to its second state. As soon as 100 pulses are stored in storage locations $a09$ to $a12$, a fare increment of $0.25 is added to the base fare of $1.25. In this way a current indication of the total fare is formed which is continuously transferred to storage 11 and thence to the indicator 14. The same is true for additional charges which are entered manually and are continuously transferred from storage locations $a13$–$a16$ into storage 11 and indicator 15. When the taxi is stopped at the completion of the ride, and the corresponding input key is depressed, no further time pulses are processed. The final fare is indicated on indicator 14 and indicator 15, being the sum of the so-indicated fares. The taximeter is reset to "0" by the activation of the "unoccupied" key which resets storage locations $a00$ to $a16$, $a38$ to $a42$ and $a43$ to $a47$. The values stored in the remaining storage locations are not extinguished, since they are required for effecting the final accounting between the driver and the fleet owner and thus must be maintained passed the individual rides.

If the taximeter is to be equipped for automatic rate changes, then corresponding constant values as applied at the output of constant furnishing means 5 by corresponding activation of lines $e38$–$e42$ at the output of decoder 21. These constants may correspond to a particular total fare, a particular distance travelled or a particular waiting time. In this case a taximeter has only one key for "unoccupied" and a second key for "occupied." However, two fare rates are available on printed circuit board 23, that is two different pulse reduction rates are available. If the fare rate is to change after a predetermined total fare has been accumulated during one ride, then the fare as it accumulates is stored not only in storage spaces $a00$ to $a04$ but also in storage locations $a38$ to $a42$. As the storage 9 is interrogated during each cycle, a comparison is made between the value stored in locations $a38$ to $a42$ with the value stored in the constant furnishing means 5, which signifies the fare at which the fare rate is to change. if this value has been reached then the constant furnishing means 5 are switched to the fare rate for fare rate 2, that is instead of lines $v1$ to $v4$, lines $w1$ to $w4$ are energized so that the indicated fare is advanced not after 2,000 pulses, but already after 1,500 pulses.

The above-described operation is essentially the same as when the key for "fare rate 2" is manually activated. This, too, causes lines $w1$ to $w4$ rather than lines $v1$ to $v4$ to be energized. Storage locations $a05$ to $a08$ then contain the reduction rate for fare rate 2 and a pulse is furnished to the input of stage 7 after 15 pulses have been received.

Transfer of the contents of storage locations $a17$ to $a37$ into buffer storage 11 and thence into the indicator 15 takes place in response to activation of one of keys 18. This, however, can only take place if the taximeter is otherwise not activated. When one of the keys 18 is activated, the corresponding command in coded form is entered into input storage 20 and is further transmitted to the control circuit 3. During the next cycle, the contents of the selected storage locations is transferred to buffer storage 11 and thus to the indicator 15.

The functioning of the computer means was described above as using a serial adder 26/27. This type of adder operates on one place at a time, that is it is not capable of operating on all place values in any number simultaneously. Thus the addition of two numbers, for example as described the addition of the number in part 27 to the number stored in part 26, can take considerable time, especially if a high number of places is to be processed. Since the incoming pulse rate can, however, be very large especially at high taxi velocities, it may be preferable to substitute a full adder for the serial adder 26/27. Such an adder could process two binary numerals in one operating cycle. Building blocks for such adders are commonly available and can be readily substituted for the serial adder described above.

Figure 6:
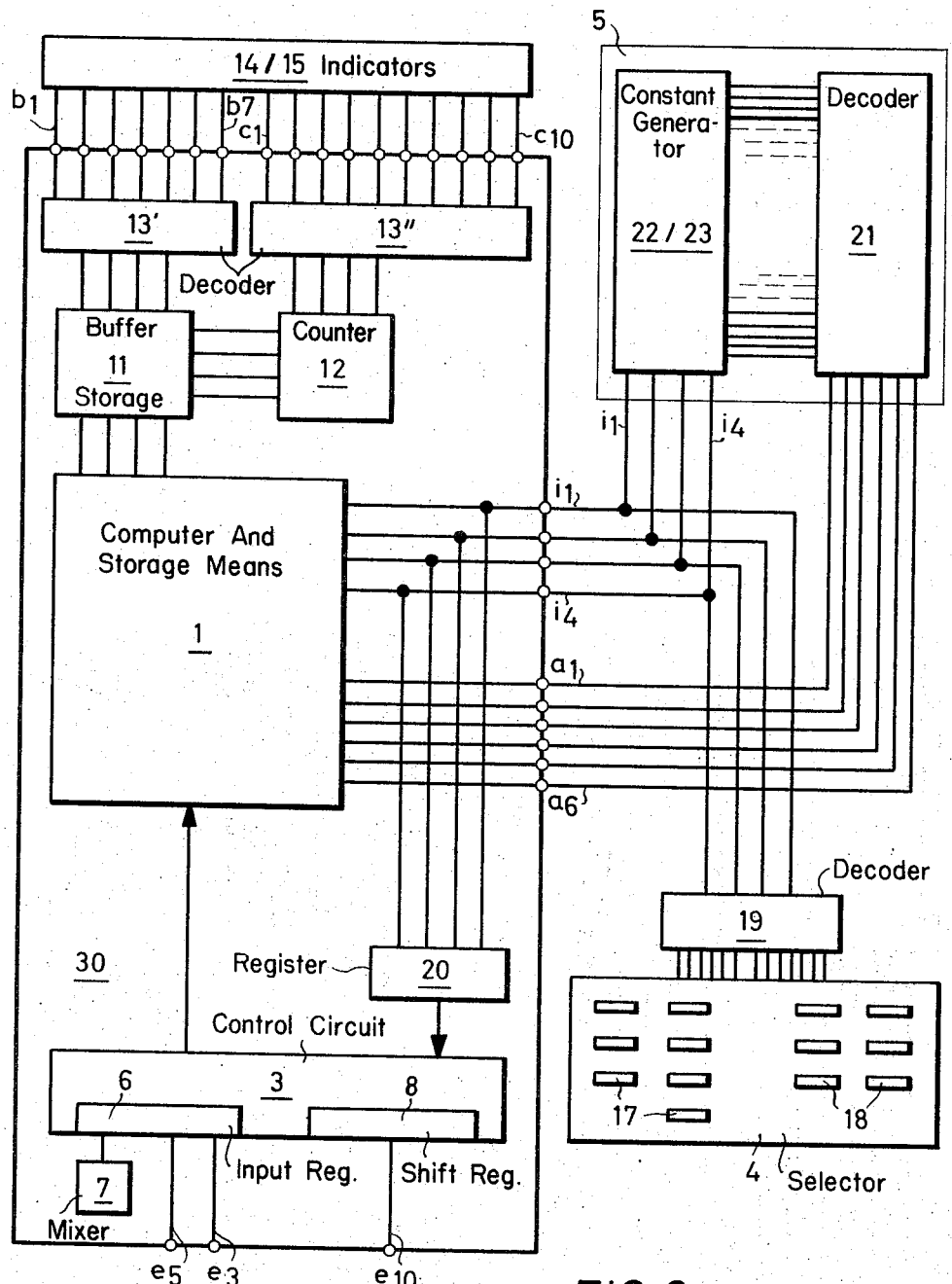
FIG. 6 is an additional block diagram of the overall taximeter, as embodied in a highly integrated circuit form.

It has been previously mentioned that it is particularly desirable to construct the taximeter in a highly integrated circuit technique, particularly in an MOS technique. In this type of circuitry as generally commercially available, only a given number of terminals can be furnished for any one building block. The taximeter must thus be so-constructed that this available number of terminals is sufficient. FIG. 6 shows how the individual building blocks in integrated circuits can be arranged on a circuit board 30 and which terminals are required. Terminals $e5$, $e3$, $e10$ are required for the measuring elements, that is for furnishing the distance pulses, the time pulses and the synchronization pulses. Terminals $a1$ to $a6$ are required for addressing the decoder 21 in the constant furnishing means 5. Terminals *i*l to *i*are required for the output lines of constant furnishing means 5. Terminals *b*1 to *b*7 as well as *c*1 to *c*10 on decoders 13' and 13" respectively for connection to indicator 14/15. Indicator 14/15 is of course externally connected. The number of terminals enumerated above comes to 30, so that 10 more terminals remain for assorted purposes such as connecting the power supply. Thus it is possible that the control circuit 3, the pulse rate selector circuit 7, the storage and computer means 1 as well as buffer storage 11, address counter 12, decoding arrangement 13 and storage 20 may all be on one circuit plate which is executed in a highly integrated circuit technique. The externally available constant furnishing means 5, the indicator 14/15, the input and output operation keyboard 4 and the measuring elements are of course externally connectable.

It should further be stated that the constant furnishing means, rather than being constructed in the manner described above can also be executed in a highly integrated circuit technique. Such constant furnishing means are available commercially from a number of firms under the name of "PROM (programmable-read-only memory).

While the invention has been illustrated and described as embodied in a taximeter using specific types of storage means, computing means and external constant furnishing means, it is not to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. An electronic taximeter, comprising, in combination, measuring means for furnishing measuring signals signifying increments of distance traveled and waiting time to be charged to a passenger; indicator means for indicating the fare to said passenger; programmable constant furnishing means for furnishing constants corresponding to predetermined fare rates; and computer and storage means having at least a first input connected to said constant furnishing means, a second input connected to said measuring means and an output connected to said indicator means, for computing said fare at least in part in response to said measuring signals and said constants.

2. An electronic taximeter as set forth in claim 1 wherein said programmable constant furnishing means is a programmable read-only memory in integrated circuit form.

3. Electronic taxi meter, comprising, in combination, measuring means for furnishing measuring signals signifying increments of distance traveled and waiting time to be charged to a passenger; programmable constant furnishing means for furnishing constants corresponding to predetermined fare rates; and computer and storage means having inputs connected to said constant furnishing means and said measuring means and an output connected to said indicator means for computing said fare at least in part in response to said measuring signals and said constants, said computer and storage means comprising a read and write storage means and a plurality of storage locations for storing at least a first and second variable required for computing an individual fare, and at least one additional variable required for computing totals following a plurality of individual trips.

4. An electronic taximeter as set forth in claim 3, wherein said storage means has a plurality of storage locations, each for storing one of said variables; wherein said computer and storage means further comprises counter means having a counting input for receiving synchronizing pulses and a plurality of counting outputs connected to said first storage means for addressing said plurality of storage locations; further comprising control circuit means connected to said counter means for furnishing said synchronizing pulses to said counting input.

5. An electronic taximeter as set forth in claim 4, wherein said constant furnishing means has an input for receiving address signals and wherein said constant furnishing means furnishes each of said constants in response to a corresponding one of said address signals; further comprising means for connecting said counting output of said counter means to said input of said constant furnishing means, whereby the signal on said counting output constitutes said address signal.

6. Electronic taxi meter comprising, in combination, measuring means for furnishing measuring signals signifying increments of distance traveled and waiting time to be charged to a passenger; indicator means for indicating the fare to said passenger; programmable constant furnishing means having an input for receiving address signals and having an output, for furnishing constants at said output, each in response to a corresponding one of said address signals; control circuit means connected to said constant furnishing means for furnishing said address signals; and computer and storage means having inputs connected to said constant furnishing means and said measuring means and an output connected to said indicator means for computing said fare at least in part in response to said measuring signals and said constants.

7. An electronic taximeter as set forth in claim 6, wherein said constant furnishing means furnishes said constants in binary coded decimal form.

8. An electronic taximeter as set forth in claim 6, wherein said computer and storage means comprise storage means computer means including adder means having a first input connected to the output of said storage means, a second input connected to the output of said measuring means and an adder output for furnishing a sum signal corresponding to the sum of the signals at said first and second inputs.

9. An electronic taximeter as set forth in claim 8, wherein said constant furnishing means furnishes a first constant indicative of a fare rate dependent value; and wherein said computer means further comprises comparator means having a first input connected to said output of said adder means and a second input connected to said constant furnishing means, for comparing said sum signal to said first constant and furnishing a comparator output signal when said sum signal is equal to said first constant.

10. An electronic taximeter as set forth in claim 8, wherein said adder means comprise character and bit serial operating adder means.

11. An electronic taximeter as set forth in claim 8, wherein said adder means comprise character serial, bit parallel adder means.

12. An electronic taximeter as set forth in claim 6, wherein said constant furnishing means has a plurality of input terminals for receiving said address signals, a plurality of outputs each signifying a predetermined numerical value when energized, and logic circuit means for interconnecting said plurality of input terminals to said plurality of outputs in such a manner that a corresponding output is energized in response to each of said address signals.

13. An electronic taximeter as set forth in claim 12, wherein said constant furnishing means comprise a plurality of printed circuit cards; and wherein said printed circuit cards are plugable printed circuit cards.

14. Electronic taxi meter set forth in claim 12, wherein said computer and storage means comprises computing means for computing said fare at a plurality of rates, each of said rates having associated constants; and wherein said constant furnishing means comprise a printed circuit card for furnishing said associated contants.

15. An electronic taximeter as set forth in claim 12, wherein said logic circuit means comprises a plurality of input lines connected to said plurality of input terminals, a plurality of output lines connected to said plurality of outputs, and soldered connections between said input and said output lines.

16. An electronic taximeter as set forth in claim 12, wherein said logic circuit means comprises a plurality of input lines connected to said plurality of input terminals, a plurality of output lines connected to said plurality of outputs and screw connections between said input lines and said output lines.

17. An electronic taximeter as set forth in claim 12, wherein said logic circuit means comprise a plurality of input lines connected to said plurality of address input terminals, a plurality of output lines connected to said plurality of outputs and diode means for interconnecting said plurality of input lines with said plurality of output lines.

18. An electronic taximeter as set forth in claim 12, further comprising decoding means connected between said computer and storage means and said plurality of input terminals.

* * * * *